US012692025B2

(12) United States Patent
Peterson et al.

(10) Patent No.: US 12,692,025 B2
(45) Date of Patent: Jul. 28, 2026

(54) SIMULATOR BOX FOR AIRCRAFT OXYGEN SYSTEM AND ASSOCIATED SYSTEM AND METHOD

(71) Applicant: The Boeing Company, Arlington, VA (US)

(72) Inventors: Ricky Peterson, Ladson, SC (US); Heath Haga, Mount Pleasant, SC (US); Peter Heinrich, Mount Pleasant, SC (US)

(73) Assignee: The Boeing Company, Arlington, VA (US)

( * ) Notice: Subject to any disclaimer, the term of this patent is extended or adjusted under 35 U.S.C. 154(b) by 245 days.

(21) Appl. No.: 18/586,437

(22) Filed: Feb. 24, 2024

(65) Prior Publication Data

US 2025/0269981 A1 Aug. 28, 2025

(51) Int. Cl.
*B64F 5/60* (2017.01)

(52) U.S. Cl.
CPC ..................................... *B64F 5/60* (2017.01)

(58) Field of Classification Search
CPC ........................................................ B64F 5/60
See application file for complete search history.

(56) References Cited

U.S. PATENT DOCUMENTS

| | | | |
|---|---|---|---|
| 2011/0208466 A1* | 8/2011 | Quast ................... | G01R 31/008 |
| | | | 702/113 |
| 2015/0157884 A1* | 6/2015 | Armatorio ............... | A62B 7/14 |
| | | | 128/202.26 |
| 2021/0225191 A1* | 7/2021 | Ross ................... | A62C 99/0081 |
| 2022/0001217 A1* | 1/2022 | Contino ................. | B64D 11/00 |
| 2023/0088372 A1* | 3/2023 | Collen ................... | G09B 9/302 |
| | | | 434/30 |

* cited by examiner

*Primary Examiner* — Eric S. McCall
(74) *Attorney, Agent, or Firm* — Massey Bean & Lewis

(57) ABSTRACT

A simulator box for troubleshooting or testing an aircraft oxygen system and associated system and method are disclosed. The simulator box includes a connection port configured to be removably connectable to a transmission line of an oxygen line replaceable unit (LRU). The simulator box also includes a controller configured to mimic functionality of the oxygen LRU. The simulator box further includes a controller area network (CANBUS) configured to facilitate communication between the controller and the transmission line. Additionally, the simulator box includes a plurality of selectively-activatable indicia. Each one of the plurality of selectively-activatable indicia corresponds to one of a plurality of power characteristics. The plurality of selectively-activatable indicia are configured to generate an indicia when a corresponding one of the plurality of power characteristics is receiving a signal from the transmission line.

20 Claims, 4 Drawing Sheets

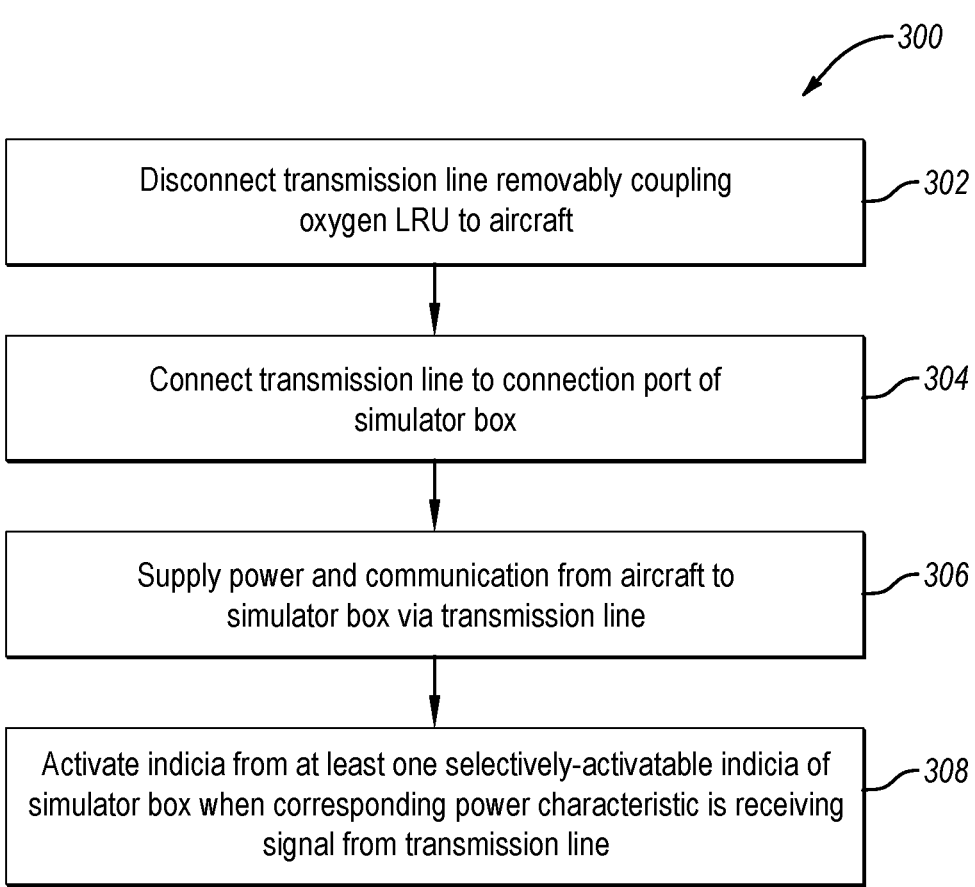

_300_

| Disconnect transmission line removably coupling oxygen LRU to aircraft | _302_ |

| Connect transmission line to connection port of simulator box | _304_ |

| Supply power and communication from aircraft to simulator box via transmission line | _306_ |

| Activate indicia from at least one selectively-activatable indicia of simulator box when corresponding power characteristic is receiving signal from transmission line | _308_ |

FIG. 4

SIMULATOR BOX FOR AIRCRAFT OXYGEN SYSTEM AND ASSOCIATED SYSTEM AND METHOD

FIELD

This disclosure relates generally to a method of trouble-shooting and more particularly to a simulator box for troubleshooting an aircraft oxygen system.

BACKGROUND

Aircraft are equipped with an aircraft oxygen system with at least one oxygen Line Replaceable Unit (LRU) housed in a corresponding one of at least one Passenger Service Unit (PSU). The LRU is specifically designed to deliver oxygen to passengers and crew in the event of an emergency. Quality assurance testing is routinely conducted on LRUs during various stages, including final aircraft assembly, to ensure optimal aircraft oxygen system functionality. The aircraft is additionally equipped with a monitoring system that promptly notifies the crew of any LRU failures within the aircraft oxygen system, necessitating troubleshooting to identify and address issues with the aircraft oxygen system. However, testing or troubleshooting the LRU involves disconnecting it from the aircraft, thereby cutting off its power supply. This power cutoff introduces challenges for accurately assessing the LRU's functionality.

SUMMARY

The subject matter of the present application has been developed in response to the present state of the art, and in particular, in response to the problems of and needs created by, or not yet fully solved by, existing aircraft oxygen systems. Generally, the subject matter of the present application has been developed to provide a simulator box for an aircraft oxygen system and associated method that overcomes at least some of the above-discussed shortcomings of prior art techniques.

Disclosed herein is a simulator box for troubleshooting an aircraft oxygen system. The simulator box includes a connection port configured to be removably connectable to an aircraft-side connection of a transmission line to an oxygen line replaceable unit (LRU). The simulator box also includes a controller configured to mimic functionality of the oxygen LRU. The simulator box further includes a controller area network (CANBUS) configured to facilitate communication between the controller and the transmission line. Additionally, the simulator box includes a plurality of selectively-activatable indicia. Each one of the plurality of selectively-activatable indicia corresponds to one of a plurality of power characteristics. Each one of the plurality of selectively-activatable indicia is configured to generate an indicia when a corresponding one of the plurality of power characteristics is receiving a signal from the transmission line. The preceding subject matter of this paragraph characterizes example 1 of the present disclosure.

The simulator box includes a status selectively-activatable indicia. The status selectively-activatable indicia is configured to generate a status indicia when the CANBUS is providing communication between the controller and the transmission line. The preceding subject matter of this paragraph characterizes example 2 of the present disclosure, wherein example 2 also includes the subject matter according to example 1, above.

The simulator box includes a terminal block including a plurality of connection points. The preceding subject matter of this paragraph characterizes example 3 of the present disclosure, wherein example 3 also includes the subject matter according to any of examples 1-2, above.

Each one of the plurality of connection points of the terminal block corresponds to one of the plurality of power characteristics, a CAN-H, a CAN-L, or a DC return. The preceding subject matter of this paragraph characterizes example 4 of the present disclosure, wherein example 4 also includes the subject matter according to example 3, above.

The terminal block includes a plurality of jumpers. Each one of the plurality of jumpers corresponds with one of the plurality of connection points of the terminal block. The preceding subject matter of this paragraph characterizes example 5 of the present disclosure, wherein example 5 also includes the subject matter according to example 3, above.

The simulator box includes a plurality of connection ports, where the connection port is one of the plurality of connection ports. Each one of the plurality of connection ports is different than any other one of the plurality of connection ports. The preceding subject matter of this paragraph characterizes example 6 of the present disclosure, wherein example 6 also includes the subject matter according to any of examples 1-5, above.

The plurality of power characteristics includes at least a main power, a backup power, and a test power. The preceding subject matter of this paragraph characterizes example 7 of the present disclosure, wherein example 7 also includes the subject matter according to any of examples 1-6, above.

The plurality of selectively-activatable indicia includes a plurality of light-emitting diodes (LEDs). Each one of the plurality of LEDs is configured to emit light when a corresponding one of the plurality of power characteristics is receiving a signal from the transmission line. The preceding subject matter of this paragraph characterizes example 8 of the present disclosure, wherein example 8 also includes the subject matter according to any of examples 1-7, above.

Each one of the plurality of LEDs is configured to at least one of flash in specific patterns or change color, to indicate different states or conditions of the corresponding one of the plurality of power characteristics. The preceding subject matter of this paragraph characterizes example 9 of the present disclosure, wherein example 9 also includes the subject matter according to example 8, above.

The simulator box includes a housing configured to encase at least the controller and the CANBUS. The preceding subject matter of this paragraph characterizes example 10 of the present disclosure, wherein example 10 also includes the subject matter according to any of examples 1-9, above.

Further disclosed here is a system for troubleshooting an aircraft oxygen system. The system includes an aircraft. The system also includes at least one oxygen Line Replaceable Unit (LRU) of the aircraft oxygen system within the aircraft. The system further includes a transmission line removably coupling the at least one oxygen LRU with the aircraft. The transmission line includes an LRU-side connection and an aircraft-side connection and is configured to provide power and communication from the aircraft. The system also includes a simulator box including a connection port configured to be removably connectable to the aircraft-side connection of the transmission line. When the LRU-side connection and the aircraft-side connection of the transmission line are disconnected, and when the aircraft-side connection of the transmission line is connected to the connection power of the simulator box, the simulator box is configured to receive power and communication from the aircraft. The preceding subject matter of this paragraph characterizes example 11 of the present disclosure.

The simulator box includes a controller configured to mimic functionality of the oxygen LRU. The simulator box further includes a controller area network (CANBUS) configured to facilitate communication between the controller and the transmission line. Additionally, the simulator box includes a plurality of selectively-activatable indicia. Each one of the plurality of selectively-activatable indicia corresponds to one of a plurality of power characteristics. Each one of the plurality of selectively-activatable indicia is configured to generate an indicia when a corresponding one of the plurality of power characteristics is receiving a signal from the transmission line. The preceding subject matter of this paragraph characterizes example 12 of the present disclosure, wherein example 12 also includes the subject matter according to example 11, above.

The simulator box includes a status selectively-activatable indicia. The status selectively-activatable indicia is configured to generate a status indicia when the CANBUS is providing communication between the controller and the transmission line. The preceding subject matter of this paragraph characterizes example 13 of the present disclosure, wherein example 13 also includes the subject matter according to example 12, above.

The plurality of selectively-activatable indicia includes a plurality of light-emitting diodes (LEDs). Each one of the plurality of LEDs is configured to emit light when a corresponding one of the plurality of power characteristics is receiving a signal from the transmission line. The preceding subject matter of this paragraph characterizes example 14 of the present disclosure, wherein example 14 also includes the subject matter according to example 12, above.

The simulator box includes a terminal block including a plurality of connection points and a plurality of jumpers. Each one of the plurality of connection points of the terminal block corresponds to one or the plurality of power characteristics, a CAN-H, a CAN-L, or a DC return. Each one of the plurality of jumpers corresponds with one or the plurality of connection points of the terminal block. The preceding subject matter of this paragraph characterizes example 15 of the present disclosure, wherein example 15 also includes the subject matter according to example 12, above.

The system includes a testing device configured to measure any of various electrical parameters of at least one of the plurality of power characteristics, a CAN-H, a CAN-L, or a DC return. The preceding subject matter of this paragraph characterizes example 16 of the present disclosure, wherein example 16 also includes the subject matter according to example 12, above.

The system includes a plurality of oxygen LRUs. The plurality of oxygen LRUs includes the at least one oxygen LRU. The connection port of the simulator box is configured to be removably connectable to the aircraft-side connection of the transmission line of any one of the plurality of oxygen LRUs. The preceding subject matter of this paragraph characterizes example 17 of the present disclosure, wherein example 17 also includes the subject matter according to any of examples 11-16, above.

Further disclosed herein is a method of troubleshooting an aircraft oxygen system. The method includes disconnecting a transmission line removably coupling an oxygen Line Replacement Unit (LRU) to an aircraft. The method also includes connecting the transmission line to a connection port of a simulator box. The simulator box is configured to mimic functionality of the oxygen LRU. The method further includes supplying power and communication from the aircraft to the simulator box via the transmission line. The method additionally includes activating indicia from at least one of a plurality of selectively-activatable indicia of the simulator box when a corresponding power characteristic is receiving a signal from the transmission line. The preceding subject matter of this paragraph characterizes example 18 of the present disclosure.

The method includes selectively manipulating a plurality of connection points of a terminal block of the simulator box. The preceding subject matter of this paragraph characterizes example 19 of the present disclosure, wherein example 19 also includes the subject matter according to example 18, above.

The method includes generating indicia from a status selectively-activatable indicia of the simulator box when a controller area network (CANBUS) of the simulator box is providing communication between a controller of the simulator box and the transmission line. The preceding subject matter of this paragraph characterizes example 20 of the present disclosure, wherein example 20 also includes the subject matter according to any of examples 18-19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which:

FIG. 4 is a schematic flow diagram of a method of troubleshooting an aircraft oxygen system, according to one or more examples of the present disclosure.

DETAILED DESCRIPTION

Reference throughout this specification to "one example," "an example," or similar language means that a particular feature, structure, or characteristic described in connection with the example is included in at least one example of the subject matter of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the subject matter of the present disclosure, however, absent an express correlation to indicate otherwise, an implementation may be associated with one or more examples.

Disclosed herein are examples of a simulator box for troubleshooting an aircraft oxygen system and associated simulator box system and method. The following provides some features of at least some examples of the simulator box and associated simulator box system and method. The simulator box is configured to be used for troubleshooting an aircraft oxygen system of an aircraft. The aircraft oxygen system includes at least one oxygen Line Replaceable Unit (LRU) designed to deliver oxygen to passengers and crew in emergency situations. The LRU requires testing or troubleshooting at various intervals, whether during quality assurance assessments or failure testing. However, according to conventional methods, any testing involving the LRU requires disconnecting it from the aircraft, leading to a power cutoff that impedes the assessment of its power and communication status. Accordingly, the simulator box of the present disclosure, being configured to effectively replicate functionality of the LRU, can be connected in place of a potentially malfunctioning LRU, to provide effective troubleshooting capabilities between the aircraft and the LRU.

Figure 1:
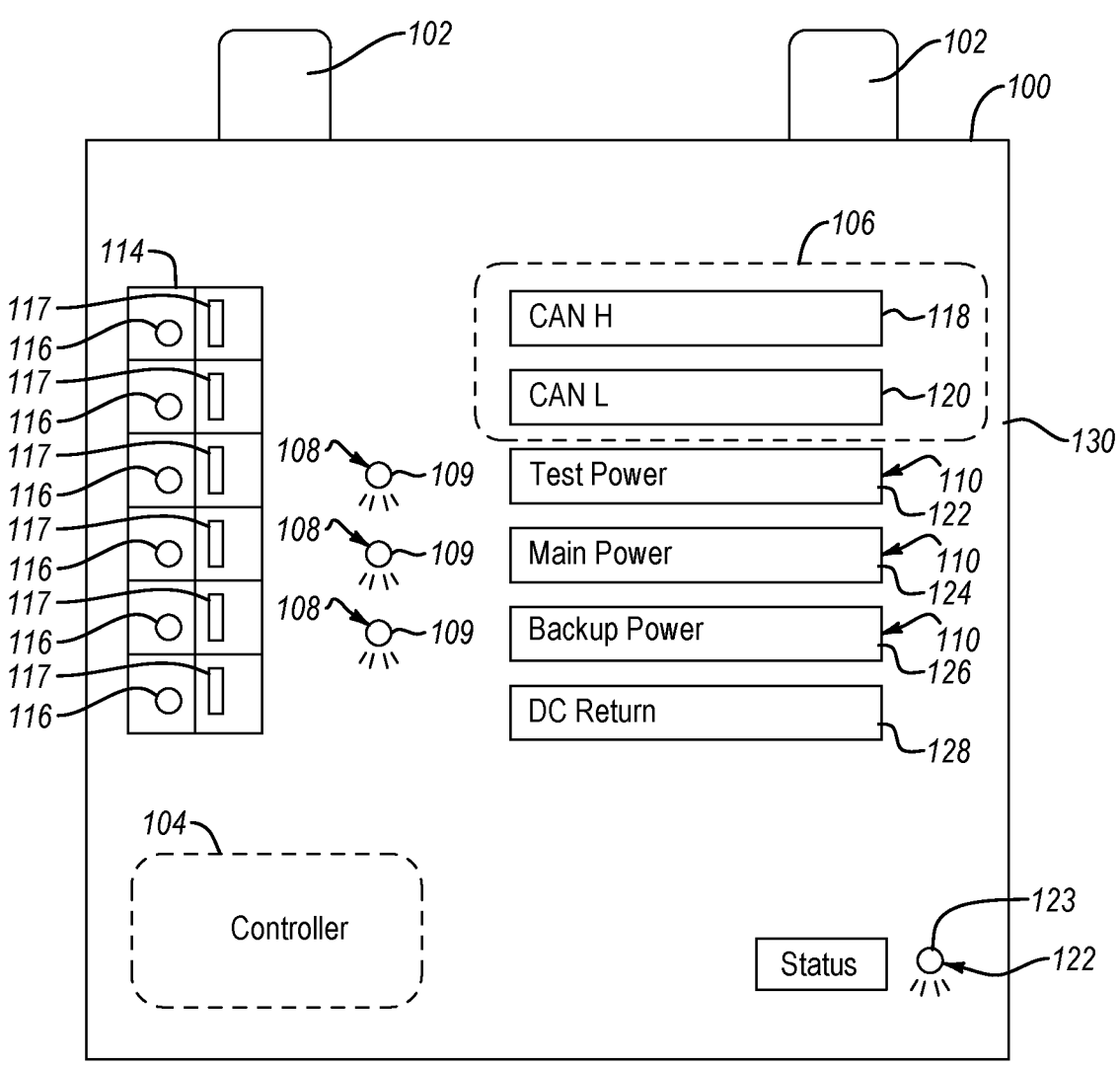
FIG. 1 is a schematic front view of a simulator box for troubleshooting an aircraft oxygen system, according to one or more examples of the present disclosure.

Referring to FIG. 1, one example of a simulator box 100 is shown. The simulator box 100 includes at least one connection port 102 configured to be removably connectable to an aircraft-side connection of a transmission line that is designed to be connected to an oxygen LRU, referred to herein as an LRU (see, e.g., FIG. 3B). In other words, the connection port 102 is a physical terminal on the simulator box 100 that allows the simulator box 100 to be mated with a transmission line of the aircraft for troubleshooting purposes. The transmission line is a permanent part of the aircraft and is configured to transmit power and data. In some examples, the simulator box 100 includes a plurality of connection ports 102. According to some examples, each one of the plurality of connection ports 102 is different than any other one of the plurality of connection ports. Therefore, each one of the plurality of connection ports 102 may be used to connect to one of a variety of different types of transmission lines of the aircraft or different transmission lines of different aircraft, allowing the same simulator box 100 to be flexibly used in connecting to various systems of the same aircraft or the same type of system in different aircraft. For example, the simulator box 100 may include multiple connection ports 102 designed to interface with one of various LRUs of the aircraft oxygen system. The simulator box 100 may have any number of connection ports 102. In some examples, the simulator box 100 has two connection ports 102, such as the simulator box 100 shown in FIG. 1. However, in other examples, the simulator box 102 has between two and five connection ports 102.

The simulator box 100 includes a controller 104, which is an electronic controller configured to mimic functionality of the LRU. Programmed to emulate the LRU's functions and responses, the controller 104 replicates the LRU's capacity to receive and process signals, execute specific tasks, and engage with other components in the aircraft oxygen system. Accordingly, the controller 104 enables the simulator box 100 to facilitate testing and troubleshooting activities for the LRU. When the simulator box 100 is connected in place of the LRU during testing, the controller 104 allows users (e.g., technicians) to evaluate the behavior of the aircraft oxygen system as if the actual LRU were connected to the aircraft. In other words, the controller 104 provides a means to assess system behavior without physically connecting the LRU to the aircraft oxygen system.

Each LRU of the aircraft oxygen system employs a Controller Area Network (CANBUS) communication protocol to establish communication with various components in the aircraft oxygen system. The CANBUS facilitates data exchange among different modules within the aircraft oxygen system, allowing for efficient and reliable communication. Accordingly, in alignment with the communication protocol, the simulator box 100 is equipped with a CANBUS 106 communication protocol, which enables interaction with the aircraft when the simulator box 100 is connected to the aircraft for testing or troubleshooting purposes. The CANBUS 106, implemented through a pair of wires each carrying differential signals, governs the messages transmitted over the wires, allowing the simulator box 100 to communicate with different components of the aircraft oxygen system. The CANBUS 106 includes a CAN High wire (i.e., CAN-H 118) and a CAN Low wire (i.e., CAN-L 120). The CAN-H 118 carries the high-voltage signals in the CANBUS 106 communication and the CAN-L 120 carries the low-voltage signals in the CANBUS 106 communication.

The simulator box 100 includes a plurality of selectively-activatable indicia 108. The selectively-activatable indicia 108 may be any visual indicator or other signal that can be activated or deactivated based on signals between the simulator box 100 and the aircraft. For example, the selectively-activatable indicia 108 may represent normal power operation or power failure warnings. In some examples, the selectively-activatable indicia 108 are a plurality of light-emitting diodes (LEDs) 109, where the LEDs are configured to emit light when a corresponding signal is received. In other examples, the selectively-activatable indicia 108 may be any of various indicia including but not limited to visual displays, audible alarms, or other light sources. The selectively-activatable indicia 108 may be configured to emit a steady indicia, such as a solid light, to indicate that a signal is being received. Conversely, the selectively-activatable indicia 108 may be configured to flash in specific patterns or change color, indicating different states or conditions of the power signal.

Each one of the plurality of selectively-activatable indicia 108 corresponds to one of a plurality of power characteristics 110. That is, each one the plurality of selectively-activatable indicia 108 is configured to generate an indicia when a corresponding one of the plurality of power characteristics 110 is receiving a signal from the aircraft. The plurality of power characteristics 110 refers to different modes or conditions related to the power signal from the aircraft to the LRU. The plurality of power characteristics 110 of the simulator box 100 therefore serves as a representation of the modes or conditions associated with the power signal transmitted from the aircraft to the LRU. Moreover, the indicia, corresponding to each one of the plurality of power characteristics 110, serves as a visual or audible indicator that the specific modes or condition of the power signal is currently receiving a signal from the aircraft. In some examples, the plurality of power characteristics 110 includes at least a main power 124, a backup power 126, and a test power 122. The main power 124 refers to the primary and standard source of power supplied to the LRU from the aircraft. In other words, the main power 124 is the normal operating power mode that sustains the regular functioning of the LRU. The backup power 126 serves as an alternative or secondary power source that activates if the main power source fails, ensuring continued LRU operation. This redundant power supply mode becomes crucial in the event of a main power disruption. Additionally, the test power 122 (i.e., build-in test, or BIT power) is a mode specifically designated for diagnostic and troubleshooting purposes. Accordingly, when the simulator box 100 is connected in place of an LRU, the indicia corresponding to the main power 124, the backup power 126, and the test power 122, provide a visual or audible indication of whether the respective power supply is receiving a signal from the aircraft.

In some examples, the simulator box 100 includes a status selectively-activatable indicia 112. The status selectively-activatable indicia 112 is configured to generate a status indicia when the CANBUS is providing communication between the controller 104 and the aircraft. Similar to the selectively-activatable indicia 108 described above, the status selectively-activatable indicia 112 may be any visual indicator or other signal that can be activated or deactivated based on signals between the simulator box 100 and the aircraft. In some examples, the status selectively-activatable indicia 112 is a status light-emitting diode (LED) 123, where the status LED is configured to emit light when the CANBUS is communicating with the simulator box 100. In other examples, the selectively-activatable indicia 108 may be any of various indicia including but not limited to visual displays, audible alarms, or other light sources.

During troubleshooting scenarios, the status selectively-activable indicia 112 is used to differentiate between potential LRU and aircraft-side issues. For example, if the simulator box 100 is connected, and the status selectively-activatable indicia 112 is providing an indicia, the CANBUS is operational and any fault detected can be attributed to the LRU, prompting focused troubleshooting to the LRU itself. Conversely, if the simulator box 100 is connected, and the CANBUS is not communicating correctly, the absence of the expected status selectively-activatable indicia 112 suggests a potential issue on the aircraft side. This could lead to further investigation into the aircraft-side wiring or related components, helping users pinpoint the source of the problem.

Additionally, the simulator box 100 may include a terminal block 114 including a plurality of connection points 116. The terminal block 114 serves as an accessible point within the simulator box 100 for troubleshooting access to the power and communication signals. The plurality of connection points 116, each featuring an aperture, enable the terminal block 114 to facilitate an electrical connection between other devices and the simulator box 100. That is, the plurality of connection points 116 serve as a junction, allowing the simulator box 100 to be connected to an electrical signal diagnostic tool. For example, a digital multimeter, oscilloscope, or other diagnostic tool can be connected to a corresponding one of the plurality of connection points 116 of the simulator box 100 to facilitate power or communication checks. Each one of the plurality of connection points 116 corresponds to one of various elements of the simulator box 100. For example, each one of the plurality of connection points 116 may correspond to one of the plurality of power characteristics 110, the CAN-H 118, the CAN-L 120, or a DC return 128. Accordingly, the plurality of connection points 116 allows a user of the simulator box 100 to tailor their troubleshooting efforts to specific elements of the power or communication signal from the aircraft.

Additionally, in some examples, the terminal block 114 also includes a plurality of jumpers 117. Each one of the plurality of jumpers 117 corresponds with one of the plurality of connection points 116 of the terminal block 114. The plurality of jumpers 117 are used to create a temporary electrical connection between two points. Accordingly, the plurality of jumpers 117 allow a user the ability to manipulate and test individual connections between the simulator box 100 and the aircraft without disassembling the entire setup. By selectively connecting or disconnecting at least one of the plurality of jumpers 117 between different connection points, users can create or break connections as needed, enabling the user to simulate various scenarios and test specific aspects of the aircraft oxygen system. For example, if a user wants to isolate a particular one of the plurality of power characteristic 110 or check the communication on the CANBUS 106, the user can use at least one of the plurality of jumpers 117 to connect or disconnect specific points on the terminal block 114. This flexibility allows for targeted troubleshooting, helping identify the cause of issues in the aircraft oxygen system without interfering with the overall configuration.

The simulator box 100 includes a housing 130 that is configured to encase essential components, such as the controller 104 and the CANBUS 106. The housing 130 serves to shield the internal electronic elements from external environmental factors, physical damage, and other potential hazards. The terminal block 114 is accessible from the external surface of the housing 130. Additionally, in the case of visual indicia, both the selectively-activatable indicia 108 and the status selectively-activatable indicia 112 are externally visible, providing a user with a visual representation of the aircraft oxygen systems status without the need to open or disassemble the housing 130. In some examples, the housing 130 includes labels indicating corresponding ones of the plurality of power characteristics 110, CAN-H 118 and CAN-L 120, or DC return 128 to a corresponding one of the plurality of connection points 116 and/or selectively-activatable indicia 108.

Figure 2:
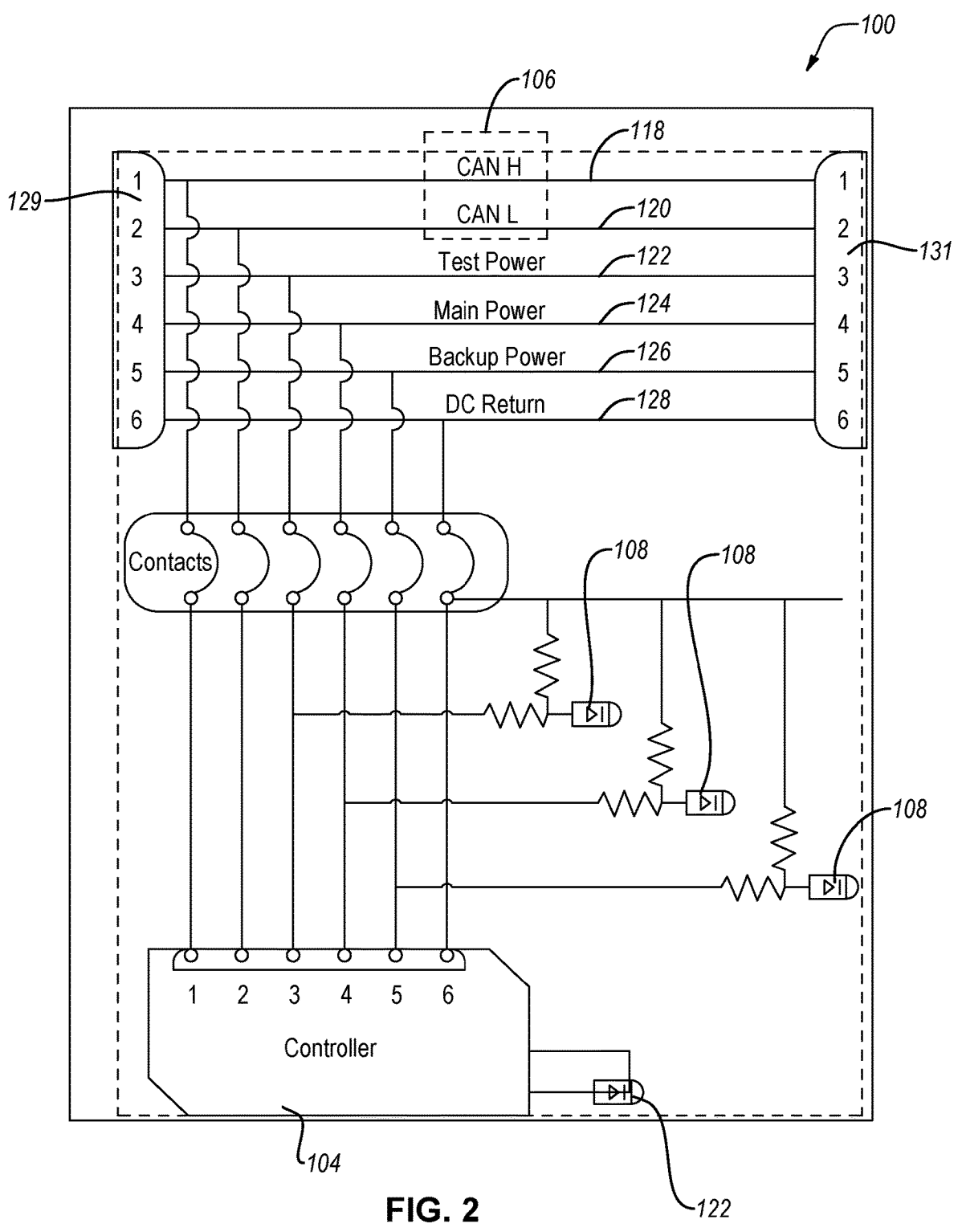
FIG. 2 is a schematic view of one example of a wiring diagram for the simulator box of FIG. 1, according to one or more examples of the present disclosure.

One example of a wiring diagram of the simulator box 100 is shown in FIG. 2. The wiring diagram illustrates at least some connections between the various components of the simulator box 100. Specifically, the wiring diagram illustrates at least some of the relationships and connections between the controller 104, CANBUS 106, power supply, and other components within the simulator box 100. As shown, the CAN-H 118, the CAN-L 120, the test power 122, the main power 124, the backup power 126 and the DC return 128 are each in electrical connection to other internal components of the simulator box 100. For example, the CAN-H 118, the CAN-L 120, the test power 122, the main power 124, the backup power 126 and the DC return 128 are each in electrical connection with a block 129 and a block 131, representing the plurality of connection points 116 and plurality of jumpers 117 associated with the internal components of the terminal block 114. The test power 122, the main power 124, and the backup power 126 are each connected to one of the plurality of selectively-activatable indicia 108, designed to emit an indicia, such as visual signals, when the corresponding power is receiving a signal from the aircraft. Additionally, the status selectively-activatable indicia 112 is in electrical connection with the controller 104, such that when the controller 104 is receiving a signal from the CANBUS 106 the status selectively-activatable indicia 112 is configured to emit indicia, such as a visual signal. The DC return 128 refers to the return path for the power signal (i.e., main power 124, test power 122, and backup power 126) and the return path for the communication signal (i.e., the CANBUS 106). That is, the DC return 128 allows the flow of direct current back to the transmission line after it has passed through the simulator box 100. As such, the simulator box 100 can also be used to troubleshoot or test the functionality of the DC return of the LRU.

Figure 3A:
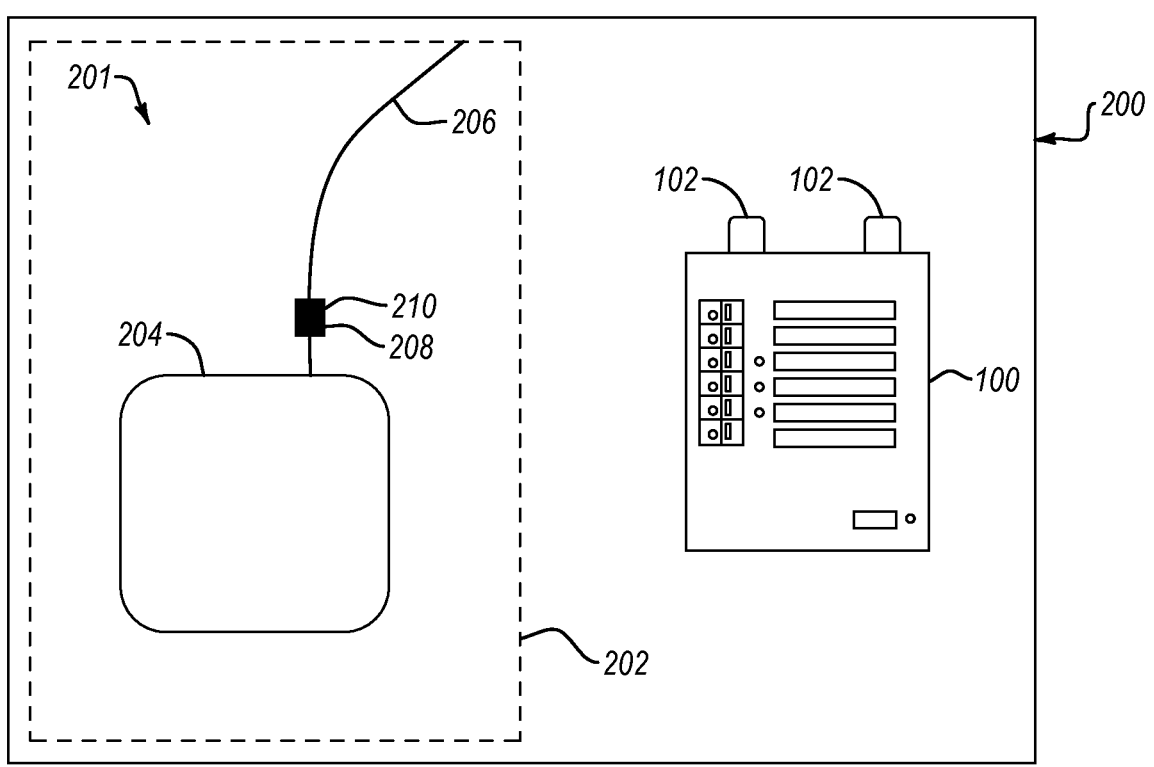
FIG. 3A is a schematic perspective view of a system for troubleshooting an aircraft oxygen system, with a transmission line connected to an LRU, according to one or more examples of the present disclosure.
Figure 3B:
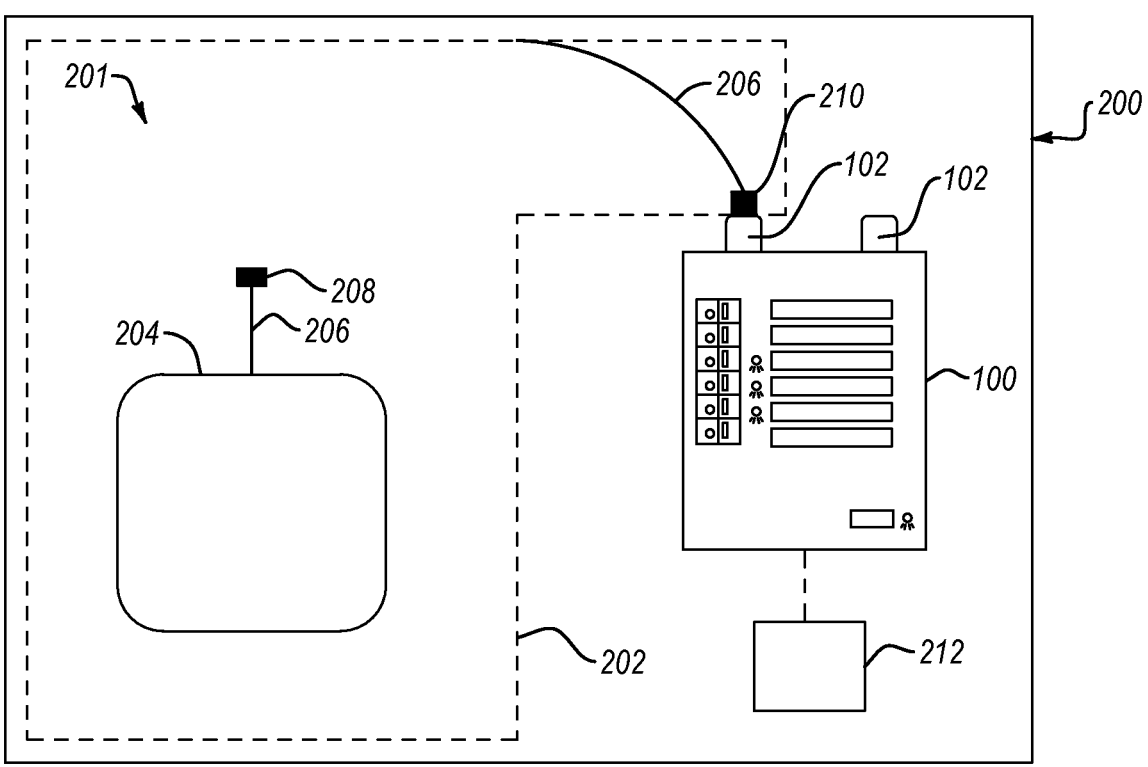
FIG. 3B is a schematic perspective view of the system of FIG. 3A, with the transmission line connected to the simulator box, according to one or more examples of the present disclosure.

A system 200 for troubleshooting an aircraft oxygen system 201 is shown in FIGS. 3A and 3B. The system 200 includes an aircraft 202, denoted by a dotted line. Within the aircraft 202, there is at least one LRU 204 of the aircraft oxygen system 201. The aircraft oxygen system 201 can comprise any number of LRUs 204, with some LRUs 204 individually housed in dedicated passenger service units (PSUs). Positioned above passenger seats, each one of the PSUs functions as a module providing controls and amenities to passengers, such as lights and vents. Moreover, the PSU serves as a housing for the LRUs 204 associated with the aircraft oxygen system 201. Typically, a PSU aligns with a specific set of passenger seats, accommodating the LRU 204 for the corresponding seating arrangement, with each LRU 204 designed to deliver oxygen to passengers within the corresponding seating arrangement. Accordingly, although shown with one LRU 204, the aircraft oxygen system 201 may have multiple LRUs 204, with each LRU 204 corresponding to at least one passenger seat. The LRU 204 is removably connectable to the aircraft 202 via a corresponding transmission line 206.

As shown in FIG. 3A, the LRU 204 is removably connected to the transmission line 206. The transmission line 206 is configured to provide power and communication from the aircraft 202 to the LRU 204, when the transmission line 206 is connected to the LRU 204. That is, the transmission line 206 facilitates the transfer of power and communication between the aircraft 202 and the LRU 204 when connected. The transmission line 206 includes an LRU-side connection 208 and an aircraft-side connection 210, which are configured to be removably connectable. In some examples, the LRU-side connection 208 is directly located on the LRU 204, rather than extending at a length from the LRU 204, as shown. The system 200 also includes the simulator box 100 including a connection port 102 that is removably connectable to the aircraft-side connection 210 of the transmission line 206. That is, when connected to the transmission line 206, the simulator box 100 is configured to receive power and communication from the aircraft 202.

When the LRU 204 is connected to the transmission line 206, the LRU 204 is capable of receiving power and communication from the aircraft 202. However, once the LRU 204 is disconnected from the transmission line 206, the LRU 204 is not capable of receiving power and communication from the aircraft 202. Lack of power and communication to the LRU 204 significantly impedes direct troubleshooting or testing with the LRU 204. Troubleshooting is often necessary to identify and rectify any issues or malfunctions that may arise in the aircraft oxygen system 201 during the operation of the aircraft 202. Additionally, testing, particularly during quality assurance assessments, is important to verify the functionality and reliability of the aircraft oxygen system 201, ensuring its effectiveness in emergency situations.

As shown in FIG. 3B, the LRU 204 is disconnected from the transmission line 206. Specifically, the LRU-side connection 208 is disconnected from the aircraft-side connection 210 of the transmission line 206. Moreover, the aircraft-side connection 210 of the transmission line 206 is removably connected to the connection port 102 of the simulator box 100. For a simulator box 100 having a plurality of connection ports 102 where each one of the plurality of connection ports 102 is distinct from others, the aircraft-side connection 210 is removably connected to the corresponding one of the plurality of connection ports 102. Accordingly, the simulator box 100 is capable of receiving power and communication from the aircraft 202.

When the simulator box 100 is connected to the transmission line 206, the simulator box 100 will receive all of the power and communication that was configured to be received to the LRU 204. Accordingly, the simulator box 100 may be used to test or troubleshoot the LRU 204 without the need for direct testing on the LRU 204 itself. In an aircraft oxygen system 201 with multiple LRUs 204, the simulator box 100 is connection to the corresponding transmission line 206 for the specific LRUs 204 undergoing testing. Specifically, the simulator box 100 may be used to determine whether the LRU 204 was receiving communication from the aircraft 202, as indicated by the status selectively-activatable indicia 112. Additionally, or alternatively, the simulator box 100 may be used to determine whether the LRU 204 was receiving a plurality of power characteristics from the aircraft 202, as indicated by the selectively-activatable indicia 108. In other examples, the simulator box 100 may include a terminal block 114, allowing the power and communication received by the simulator box 100 to be tested, isolated, or otherwise manipulated.

In some examples, the system 200 may include a testing device 212. The testing device 212 is configured to measure any of various electrical parameters of the power and/or the communication signal received by the simulator box 100. Electrical parameters may include, but are not limited to, voltage, current, resistance, frequency, waveform analysis, or continuity. In some examples, the testing device 212 is a digital multimeter, oscilloscope, or other diagnostic tool. The testing device 212 is removably connectable to the terminal block 114 of the simulator box 100. Specifically, the testing device 212 can be connected to one of the plurality of connection points 116 of the terminal block 114 to measure an electrical parameter of the corresponding element, such as one of the plurality of power characteristics 110, the CAN-H 118, the CAN-L 120, or the DC return 128.

Referring to FIG. 4, according to some examples, is a method 300 of troubleshooting an aircraft oxygen system. The method 300 includes the step of (block 302) disconnecting a transmission line 206 removably coupling an oxygen LRU 204 to an aircraft 202. Disconnecting the transmission line 206 from the LRU 204 prevents the LRU 204 from receiving power and communication from the aircraft 202, via the transmission line 206. Moreover, a lack of power and communication to the LRU 204 impedes direct troubleshooting or testing with the LRU 204. The method also includes the step of (block 304) connecting the transmission line 206 to a connection port 102 of a simulator box 100. The simulator box 100 is configured to mimic functionality of the LRU 204. The method further includes the step of (block 306) supplying power and communication from the aircraft 202 to the simulator box 100 via the transmission line 206. That is, when the simulator box 100 is connected to the transmission line 206, the simulator box 100 receives all of the power and communication that was previously received by the LRU 204. Moreover, the simulator box 100 may be used to test or troubleshoot the LRU 204 that was previously disconnected from the transmission line 206, without the need for direct testing on the LRU 204.

The method 300 also includes the step of (block 308) activating indicia from at least one of a plurality of selectively-activatable indicia 108 of the simulator box 100 when a corresponding power characteristic 110 is receiving a signal from the transmission line 206. That is, when the simulator box 100 is connected to the transmission line 206 and successfully receiving power, the corresponding selectively-activatable indicia 108 are activated to provide a visual or audible signal. The activation serves as a real-time indicator, offering immediate feedback about the status of the power supply, ensuring the receipt or lack of power supply between the simulator box 100 and the aircraft 202. Accordingly, activation of the selectively-activatable indicia 108 on the simulator box 100 signifies that the corresponding one of the plurality of power characteristics 110 is currently receiving power. In practical terms, activation indicates that the transmission line 206 is successfully transmitting the specified power. In other words, the transmission line 206 will transmit the specified power to the LRU 204, when the LRU 204 is connected to the transmission line 206. Conversely, inactive ones of the selectively-activatable indicia 108 indicates that the transmission line 206 is not transmitting the specified power to the simulator box 100. As a result, the transmission line 206 will not transmit the specified power to the LRU 204, when the LRU 204 is connected to the transmission line 206. This activation or inactivation data provides a means to identify and rectify any issues or malfunctions with the LRU 204 or the power supply from the transmission line 206.

In some examples, the method 300 also includes the step of activating indicia from a status selectively-activatable indicia 112 of the simulator box 100 when a CANBUS 106 of the simulator box 100 is receiving a communication signal from the transmission line 206. Similar to the selectively-activatable indicia 108, when the simulator box 100 is connected to the transmission line 206 and successfully receiving communication, the status selectively-activatable indicia 112 is activated to provide a visual or audible signal. The activation serves as a real-time indicator, offering immediate feedback about the status of the communication signal, ensuring the receipt or lack of communication between the simulator box 100 and the aircraft 202. This activation indicates that the transmission line 206 is successfully transmitting the communication signals to the controller 104 of the simulator box 100 and will transmit the communication signal to the LRU 204, when the LRU 204 is connected to the transmission line 206. Conversely, inactive status selectively-activatable indicia 112 indicates that the transmission line 206 is not transmitting the communication signal to the simulator box 100 and will not transmit the communication signal to the LRU 204, when the LRU 204 is connected to the transmission line 206. This activation or inactivation data provides a means to identify and rectify any issues or malfunctions with the communication of the LRU 204 or from the communication signal from the transmission line 206.

In some examples, the method 300 further includes the step of selectively manipulating a plurality of connection points 116 of a terminal block 114 of the simulator box 100. The plurality of connection points 116 are configured to facilitate troubleshooting and testing of the power and communication signal to the simulator box 100 from the aircraft 202. Specifically, by connecting various ones of the testing devices 212, such as a digital multimeter or oscilloscope to one of the plurality of connection points 116, a user gains access to the corresponding power or communication signal to the simulator box 100. In other words, intentional manipulation allows a user to pinpoint any issues or irregularities in the corresponding power or communication signal to the simulator box 100. The obtained data serves as a tool to pinpoint and address potential issues or malfunctions in the power and/or communication signals between the LRU 204 and the transmission line 206.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The electronic controller and any associated modules described in this specification may be implemented as a hardware circuit comprising custom VLSI circuits or gate arrays, off-the-shelf semiconductors such as logic chips, transistors, or other discrete components. The electronic controller may also be implemented in programmable hardware devices such as field programmable gate arrays, programmable array logic, programmable logic devices or the like.

The electronic controller may also be implemented in code and/or software for execution by various types of processors. An identified module of code may, for instance, comprise one or more physical or logical blocks of executable code which may, for instance, be organized as an object, procedure, or function. Nevertheless, the executables of the electronic controller need not be physically located together, but may comprise disparate instructions stored in different locations which, when joined logically together, comprise the electronic controller and achieve the stated purpose for the electronic controller.

Indeed, code of the electronic controller may be a single instruction, or many instructions, and may even be distributed over several different code segments, among different programs, and across several memory devices. Similarly, operational data may be identified and illustrated herein within the electronic controller, and may be embodied in any suitable form and organized within any suitable type of data structure. The operational data may be collected as a single data set, or may be distributed over different locations including over different computer readable storage devices. Where the electronic controller or portions of the electronic controller are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The described features, structures, or characteristics of the embodiments may be combined in any suitable manner. In the above description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/ acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The present subject matter may be embodied in other specific forms without departing from its spirit or essential characteristics. The described examples are to be considered in all respects only as illustrative and not restrictive. All changes which come within the meaning and range of equivalency of the examples herein are to be embraced within their scope.

What is claimed is:

1. A simulator box for troubleshooting an aircraft oxygen system, comprising:
   a connection port configured to be removably connectable to an aircraft-side connection of a transmission line to an oxygen Line Replaceable Unit (LRU);
   a controller configured to mimic functionality of the oxygen LRU;
   a controller area network (CANBUS) configured to facilitate communication between the controller and the transmission line; and
   a plurality of selectively-activatable indicia, wherein each one of the plurality of selectively-activatable indicia corresponds to one of a plurality of power characteristics, and wherein each one the plurality of selectively-activatable indicia is configured to generate an indicia when a corresponding one of the plurality of power characteristics is receiving a signal from the transmission line.

2. The simulator box of claim 1, further comprising a status selectively-activatable indicia, wherein the status selectively-activatable indicia is configured to generate a status indicia when the CANBUS is providing communication between the controller and the transmission line.

3. The simulator box of claim 1, further comprising a plurality of connection ports, where the connection port is one of the plurality of connection ports and each one of the plurality of connection ports is different than any other one of the plurality of connection ports.

4. The simulator box of claim 1, wherein the plurality of power characteristics comprises at least a main power, a backup power, and a test power.

5. The simulator box of claim 1, further comprising a housing configured to encase at least the controller and the CANBUS.

6. The simulator box of claim 1, wherein the plurality of selectively-activatable indicia comprise a plurality of light-emitting diodes (LEDs), wherein each one of the plurality of LEDs is configured to emit light when a corresponding one of the plurality of power characteristics is receiving a signal from the transmission line.

7. The simulator box of claim 6, wherein each one of the plurality of LEDs is configured to at least one of flash in specific patterns or change color, to indicate different states or conditions of the corresponding one of the plurality of power characteristics.

8. The simulator box of claim 1, further comprising a terminal block comprising a plurality of connection points.

9. The simulator box of claim 8, wherein each one of the plurality of connection points of the terminal block corresponds to one of the plurality of power characteristics, a CAN-H, a CAN-L, or a DC return.

10. The simulator box of claim 8, wherein:
   the terminal block further comprises a plurality of jumpers; and
   each one of the plurality of jumpers corresponds with one of the plurality of connection points of the terminal block.

11. A system for troubleshooting an aircraft oxygen system, the system comprising:
   an aircraft;
   at least one oxygen Line Replaceable Unit (LRU) of the aircraft oxygen system within the aircraft;
   a transmission line removably coupling the at least one oxygen LRU with the aircraft, the transmission line comprising an LRU-side connection and an aircraft-side connection and configured to provide power and communication from the aircraft; and
   a simulator box comprising a connection port configured to be removably connectable to the aircraft-side connection of the transmission line, wherein when the LRU-side connection and the aircraft-side connection of the transmission line are disconnected, and when the aircraft-side connection of the transmission line is connected to the connection port of the simulator box, the simulator box is configured to receive power and communication from the aircraft.

12. The system of claim 11, further comprising a plurality of oxygen LRUs, wherein the plurality of oxygen LRUs includes the at least one oxygen LRU and wherein the connection port of the simulator box is configured to be removably connectable to the aircraft-side connection of the transmission line of any one of the plurality of oxygen LRUs.

13. The system of claim 11, wherein the simulator box further comprises:

a controller configured to mimic functionality of the at least one oxygen LRU;

a controller area network (CANBUS) configured to facilitate communication between the controller and the transmission line; and a plurality of selectively-activatable indicia, wherein each one of the plurality of selectively-activatable indicia corresponds to one of a plurality of power characteristics, and wherein each one the plurality of selectively-activatable indicia is configured to generate an indicia when a corresponding one of the plurality of power characteristics is receiving a signal from the transmission line.

14. The system of claim 13, wherein the simulator box further comprises a status selectively-activatable indicia, wherein the status selectively-activatable indicia is configured to generate a status indicia when the CANBUS is providing communication between the controller and the transmission line.

15. The system of claim 13, wherein the plurality of selectively-activatable indicia comprise a plurality of light-emitting diodes (LEDs), wherein each one the plurality of LEDs is configured to emit light when a corresponding one of the plurality of power characteristics is receiving a signal from the transmission line.

16. The system of claim 13, wherein:

the simulator box further comprises a terminal block comprising a plurality of connection points and a plurality of jumpers;

18 each one of the plurality of connection points of the terminal block corresponds to one of the plurality of power characteristics, a CAN-H, a CAN-L, or a DC return; and each one of the plurality of jumpers corresponds with one of the plurality of connection points of the terminal block.

17. The system of claim 13, further comprising a testing device configured to measure any of various electrical parameters of at least one of the plurality of power characteristics, a CAN-H, a CAN-L, or a DC return.

18. A method of troubleshooting an aircraft oxygen system, the method comprising:

disconnecting a transmission line removably coupling an oxygen Line Replaceable Unit (LRU) to an aircraft;

connecting the transmission line to a connection port of a simulator box, wherein the simulator box is configured to mimic functionality of the oxygen LRU;

supplying power and communication from the aircraft to the simulator box via the transmission line; and activating indicia from at least one of a plurality of selectively-activatable indicia of the simulator box when a corresponding power characteristic is receiving a signal from the transmission line.

19. The method of claim 18, further comprising selectively manipulating a plurality of connection points of a terminal block of the simulator box.

20. The method of claim 18, further comprising generating indicia from a status selectively-activatable indicia of the simulator box when a controller area network (CANBUS) of the simulator box is providing communication between a controller of the simulator box and the transmission line.

* * * * *